United States Patent
Li et al.

(10) Patent No.: US 9,565,135 B2
(45) Date of Patent: Feb. 7, 2017

(54) SYSTEM AND METHOD FOR SERVICE CHAINING WITH TUNNEL CHAINS IN SOFTWARE DEFINED NETWORK

(71) Applicant: Futurewei Technologies, Inc., Plano, TX (US)

(72) Inventors: Zhenjiang Li, San Jose, CA (US); Fangping Liu, San Jose, CA (US); Ke Lin, Hangzhou (CN)

(73) Assignee: Futurewei Technologies, Inc., Plano, TX (US)

( * ) Notice: Subject to any disclaimer, the term of this patent is extended or adjusted under 35 U.S.C. 154(b) by 105 days.

(21) Appl. No.: 14/530,278

(22) Filed: Oct. 31, 2014

(65) Prior Publication Data

US 2016/0127181 A1  May 5, 2016

(51) Int. Cl.
  *H04L 12/28* (2006.01)
  *H04L 12/933* (2013.01)
  *H04B 1/00* (2006.01)
  *H04L 12/24* (2006.01)

(52) U.S. Cl.
  CPC .......... *H04L 49/15* (2013.01); *H04B 1/0003* (2013.01); *H04L 41/0806* (2013.01); *H04L 41/5051* (2013.01); *H04L 41/5077* (2013.01)

(58) Field of Classification Search
  CPC .. H04L 41/0813; H04L 49/15; H04L 41/0806; H04L 41/5051; H04L 41/5077; H04B 1/0003
  See application file for complete search history.

(56) References Cited

U.S. PATENT DOCUMENTS

| | | | |
|---|---|---|---|
| 2013/0194914 A1* | 8/2013 | Agarwal | H04L 45/245 370/225 |
| 2013/0329601 A1* | 12/2013 | Yin | H04L 45/02 370/254 |
| 2014/0192645 A1* | 7/2014 | Zhang | H04L 47/12 370/235 |
| 2015/0003283 A1* | 1/2015 | Previdi | H04L 41/12 370/254 |
| 2015/0055623 A1* | 2/2015 | Li | H04W 40/04 370/331 |
| 2015/0109967 A1* | 4/2015 | Hogan | H04W 76/022 370/259 |
| 2015/0244463 A1* | 8/2015 | Ravindran | H04L 29/00 398/58 |
| 2015/0250009 A1* | 9/2015 | Kahn | H04W 76/026 370/329 |
| 2015/0319089 A1* | 11/2015 | Liu | H04L 45/745 370/392 |
| 2015/0326426 A1* | 11/2015 | Luo | H04L 41/0654 370/218 |
| 2015/0358850 A1* | 12/2015 | La Roche, Jr. | H04W 28/0215 370/328 |
| 2015/0381493 A1* | 12/2015 | Bansal | H04L 45/30 370/392 |

(Continued)

*Primary Examiner* — Robert Wilson
(74) *Attorney, Agent, or Firm* — Slater Matsil, LLP

(57) ABSTRACT

An embodiment method of service chaining in a software defined network (SDN) having SDN switches includes receiving a service chain requirement having a plurality of services. Respective tunnels are then defined for the plurality of services. The method then configures the SDN switches to establish the respective tunnels and form a tunnel chain.

24 Claims, 5 Drawing Sheets

(56) References Cited

U.S. PATENT DOCUMENTS

| | | | |
|---|---|---|---|
| 2015/0381515 A1* | 12/2015 | Mattson | H04L 41/145 707/609 |
| 2016/0050125 A1* | 2/2016 | Mattson | H04L 41/5051 709/225 |
| 2016/0050159 A1* | 2/2016 | Cook | H04L 67/10 709/226 |
| 2016/0087905 A1* | 3/2016 | Liu | H04L 67/32 370/236 |
| 2016/0094383 A1* | 3/2016 | Wang | H04L 41/082 709/221 |
| 2016/0127181 A1* | 5/2016 | Li | H04L 41/0813 370/254 |

* cited by examiner

SYSTEM AND METHOD FOR SERVICE CHAINING WITH TUNNEL CHAINS IN SOFTWARE DEFINED NETWORK

TECHNICAL FIELD

The present invention relates generally to service chaining in software defined networks (SDNs) and, in particular embodiments, to an SDN controller and method for service chaining.

BACKGROUND

Driven largely by smart phones, tablets, video streaming, cloud-based networking, etc., the amount of data handled by datacenter and service provider networks has risen markedly and is expected to continue to rise by orders of magnitude over the next ten years. In addition to the sheer volume of data, the number of devices is expected to continue to grow exponentially, possibly reaching into the billions of devices, along with radically higher data rates. Different applications will place different requirements on the performance of future networks. Future networks are expected to be highly flexible, highly efficient, open, and customizable for customers and consumers.

The advent of cloud-based networking has complicated the ability of future networks to satisfy expected demands for higher throughput, lower latencies, lower energy, lower costs, and drastically more numerous connections. Cloud-based networking fundamentally redefines the endpoints and the time frame for which network services are provisioned. It requires the network be much more nimble, flexible, and scalable. Thus, technologies such as network function virtualization (NFV) and SDNs have become increasingly important in building future networks. SDNs allow the abstraction of network capabilities and resources. The network capabilities and resources can then be provisioned according to service-oriented policies for customers and users.

SUMMARY

An embodiment method of service chaining in a software defined network (SDN) includes receiving a service chain requirement. The service chain requirement includes a plurality of services. Respective tunnels are then defined for the plurality of services. The SDN includes multiple SDN switches. The method also includes configuring the SDN switches to establish the respective tunnels and form a tunnel chain.

An embodiment SDN controller includes a north-bound interface (NBI), a service engine, and a south-bound interface (SBI). The NBI is used to receive a service chain policy. The service chain policy defines a service chain having a plurality of services. The service engine is configured to decompose the service chain policy into respective tunnels corresponding to adjacent service pairs of the plurality of services. The service engine is also configured to compute configurations corresponding to the respective tunnels. The SBI is then used to communicate the configurations to an SDN switch layer to establish the respective tunnels and form a tunnel chain.

An embodiment method of service chaining in an SDN includes receiving a service chain policy at an SDN controller. The service chain policy is received from an abstract layer over an NBI. The service chain policy defines a service chain having a plurality of services. A service engine then parses the plurality of services into adjacent service pairs. The adjacent service pairs are mapped to respective tunnels. The service engine then computes first configurations corresponding to the respective tunnels. The service engine also computes second configurations for concatenating the respective tunnels into a tunnel chain. The SDN includes multiple SDN switches. The SDN controller communicates the first configurations and the second configurations to the SDN switches to establish the respective tunnels and the tunnel chain.

A packet-in operation occurs at an SDN edge node when an initial service request arrives, and the SDN controller receives and processes the packet-in packet, and then directs the request into the corresponding tunnel chain.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
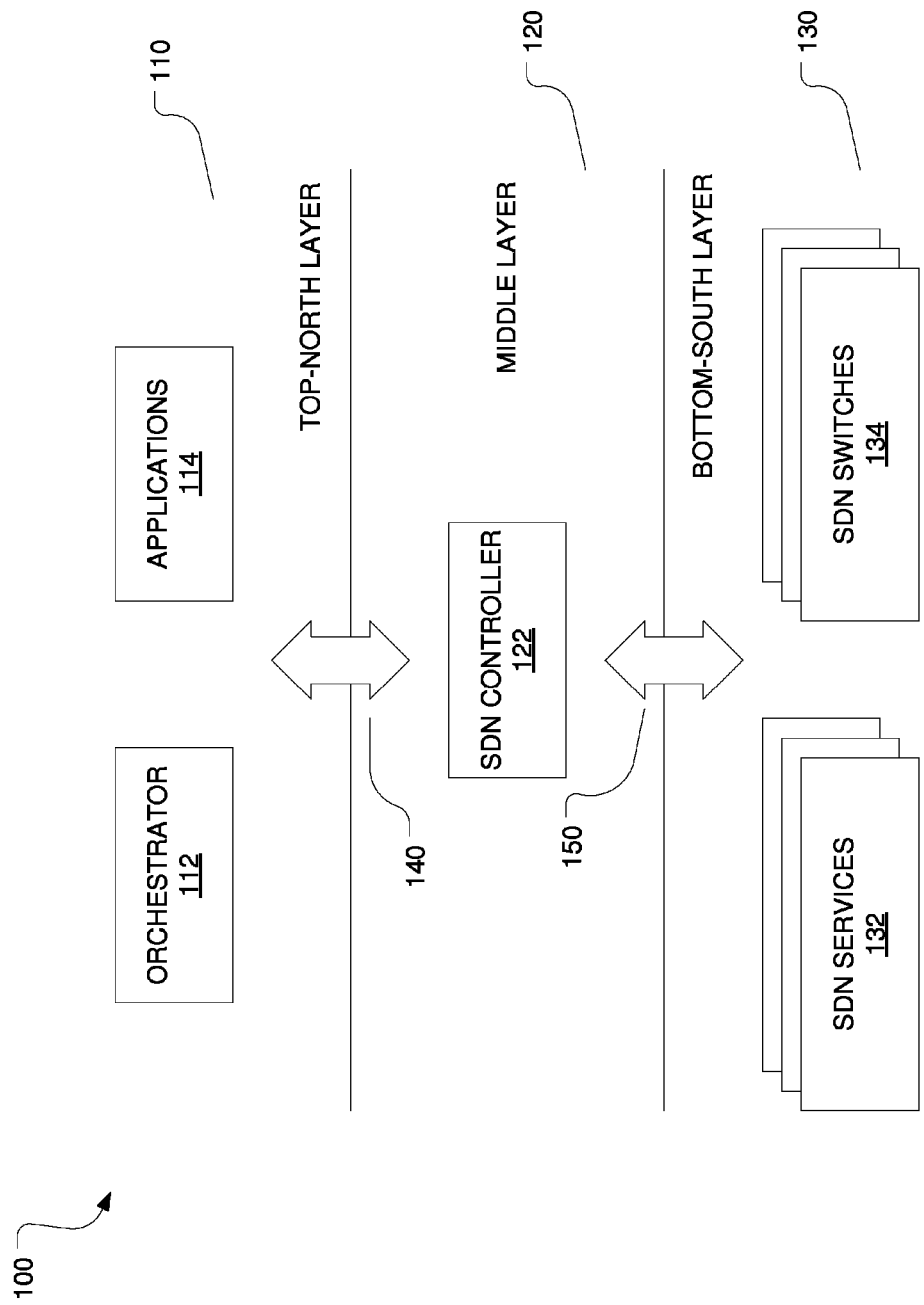
FIG. 1 is a block diagram of one embodiment of a multi-layer SDN.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

Service chains are ordered groups of individual services that are defined by a pre-defined system policy, which is referred to as a service chain policy. For a given target service, a service chain policy dictates that one or more other services should accompany the given target service in a particular order. The service chain policy can comprehend numerous considerations, including security, performance, quality of service, and others. The service chain policy can be put in place for a particular user or one or more groups of users. Service chain policies are highly abstracted, which allows administrators to flexibly tune service provisioning for different users.

An SDN can generally be divided into three layers. The top layer, or "top-north," is where SDN orchestrators and applications define service chain policies. Services are highly abstracted at the top layer and can include firewalls, network address translation (NAT), cache, web, intruder detection system (IDS), email, load balancing (LB) services, global positioning system (GPS) services, and structured query language (SQL) services, among others. A given service chain policy operates to chain multiple services in a particular order. For example, for a user requesting email service, a service chain policy can require a firewall service precede the email service. In another example, for a user requesting web service, another service chain policy can require a service chain including a firewall, NAT, cache, and the web service.

In a typical SDN, the various individual services in a service chain are implemented on one or more host computing systems. The individual services and SDN switches are each considered a node in the SDN. Given a service chain policy that defines the service chain, an SDN controller can configure the SDN nodes, which include the individual services and the SDN switches, to guide network traffic from an ingress point on the SDN, through the service chain, and on to its destination.

When a user first requests a particular service, the initial service request arrives at the ingress point in the SDN, which is typically an edge node, e.g., edge switch or router. Having no prior knowledge of the service, the edge node sends a packet-in message to the SDN controller. The SDN controller then configures the edge node according to the service chain and corresponding service chain policy. The edge node then forwards the traffic for the requested service to the next service in the service chain. When the traffic is processed by that service, it is then routed to the next service in the service chain. As the traffic hops from one service to the next, and from one switch to the next, each node sends a packet-in message to the SDN controller and the SDN controller responds by configuring the nodes.

It is realized herein that service chaining can be achieved more efficiently using tunnels and tunnel chaining. It is further realized herein that service chaining with pre-established tunnel chaining can improve latency in configuring the various nodes of the SDN and can improve provisioning performance.

FIG. 1 is a block diagram of one embodiment of an SDN 100. SDN 100 includes a top-north layer 110, a middle layer 120, and a bottom-south layer 130. Top-north layer 110 includes an orchestrator 112 and applications 114. Orchestrator 112 and applications 114 are abstract layer entities responsible for defining service chain policies and service requirements. Middle layer 120 includes an SDN controller 122. Orchestrator 112 and applications 114 communicate to SDN controller 122 through a north-bound interface (NBI) 140. NBI 140 can be implemented using a variety of interfaces, including open-standard interfaces. Orchestrator 112 and applications 114 communicate the service chain policies to SDN controller 122 through NBI 140.

SDN controller 122 is responsible for programming various SDN nodes in bottom-south layer 130 according to the service requirements and service chain policies it receives from top-north layer 110. The SDN nodes in bottom-south layer 130 can include SDN services 132 and SDN switches 134. SDN controller 122 communicates with SDN services 132 and SDN switches 134 using a south-bound interface (SBI) 150. SBI 150 can also be implemented using a variety of interfaces. For example, in certain embodiments, SBI 150 can include an OpenFlow protocol.

Figure 2:
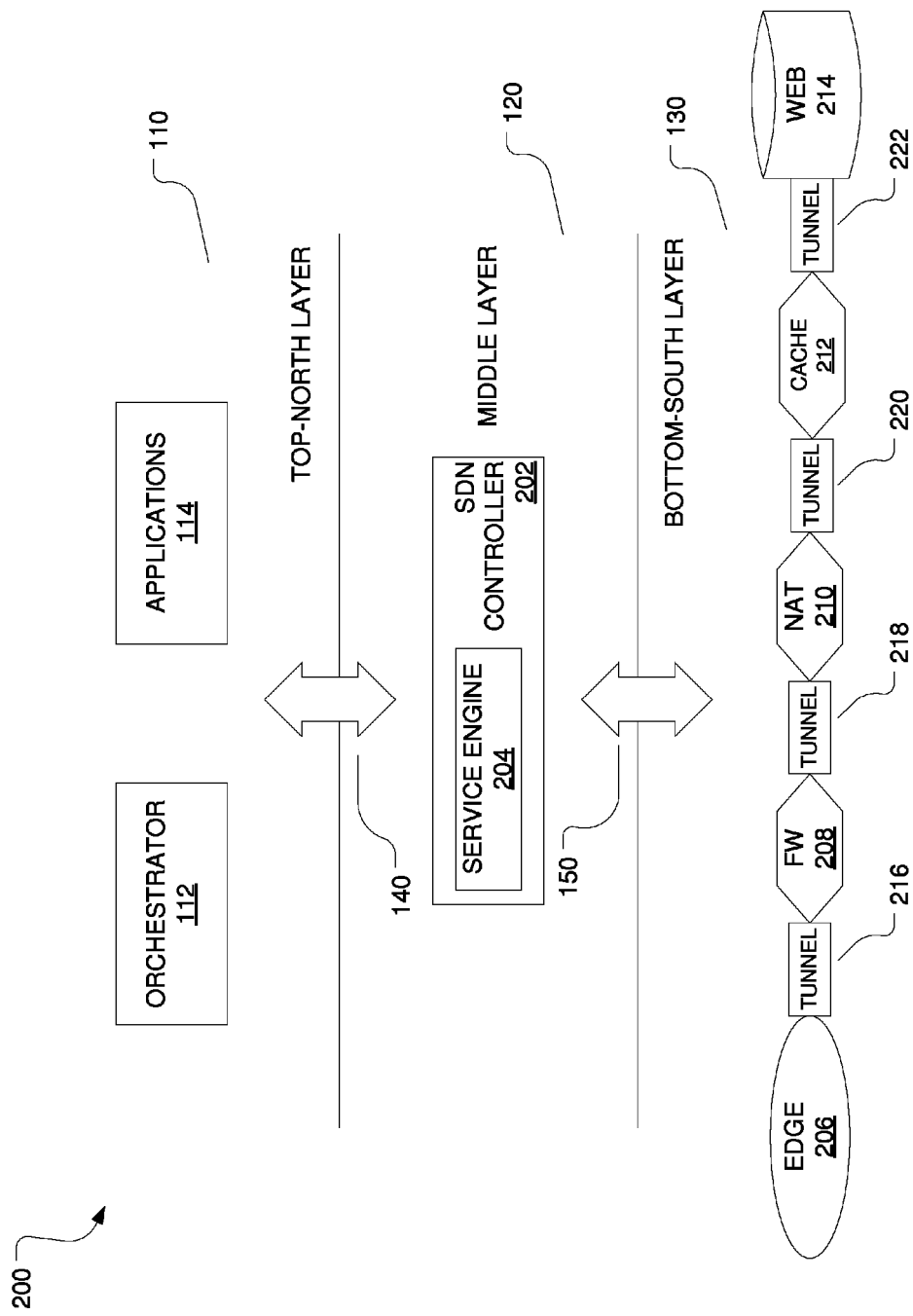
FIG. 2 is a block diagram of one embodiment of an SDN within which the SDN controller or method of service chaining introduced herein may be embodied or carried out.

FIG. 2 is a block diagram of one embodiment of an SDN 200 within which the SDN controller or method of service chaining introduced herein may be embodied or carried out. SDN 200 includes the three layers of SDN 100 from FIG. 1, top-north layer 110, middle layer 120, and bottom-south layer 130. As in the embodiment of FIG. 1, top-north layer 110 includes orchestrator 112 and applications 114 that communicate with middle layer 120 through NBI 140. Middle layer 120 includes an SDN controller 202. SDN controller 202 includes a service engine 204. SDN controller 202 communicates with bottom-south layer 130 using SBI 150.

SDN controller 202 is configured to receive a service chain policy from top-north layer 110 over NBI 140. The service chain policy includes multiple services in a particular order. Service engine 204 parses the multiple services into adjacent service pairs. An adjacent service pair is a pair of individual services to be executed consecutively according to the service chain policy. For example, in a web service chain, a web service is immediately preceded by a cache service. The web service and the cache service form an adjacent service pair. In the embodiment of FIG. 2, the service chain includes a firewall 208, a NAT 210, a cache 212, and a web 214. The first adjacent service pair for a given service chain includes a null service to be carried out by an edge node 206 that receives the initial service request. In the embodiment of FIG. 2, the adjacent service pairs include null-FW, FW-NAT, NAT-cache, and cache-web.

Service engine 204 maps each adjacent service pair to a tunnel. The null-FW pair is mapped to a tunnel 216, the FW-NAT pair to a tunnel 218, the NAT-cache pair to a tunnel 220, and the cache-web pair to a tunnel 222. Service engine 204 then computes configurations to be pushed down to bottom-south layer 130 to establish the tunnels. Service engine 204 can also compute configurations to direct flow at each tunnel to the next service in the service chain, such that tunnels 216, 218, 220, and 222 are concatenated into a tunnel chain.

Once the configurations for bottom-south layer 130 are computed by SDN controller 202, rather than wait for a packet-in from edge node 206, SDN controller pushes the configurations down to bottom-south layer 130 using SBI 150, establishing the tunnels and the tunnel chain. The various SDN switches in bottom-south layer 130 receive the configurations and configure the hardware resources accordingly.

When the initial service request arrives at edge node 206, an initial packet-in message is sent to SDN controller 202. SDN controller 202 then configures the flow tables of edge node 206, to direct the request into tunnel 216 in the tunnel chain. No additional packet-in messages or subsequent configurations are needed. Furthermore, tunnel chains are configured on-demand for orchestrator 112 or applications 114, allowing conservation of network resources for unutilized service points.

SDN controller 202 and service engine 204 can be implemented in one or more processors, one or more application specific integrated circuits (ASICs), one or more field-programmable gate arrays (FPGAs), dedicated logic circuitry, or any combination thereof, all collectively referred to as a processor. The respective functions for SDN controller 202 and service engine 204 can be stored as instructions in non-transitory memory for execution by the processor.

Figure 3:
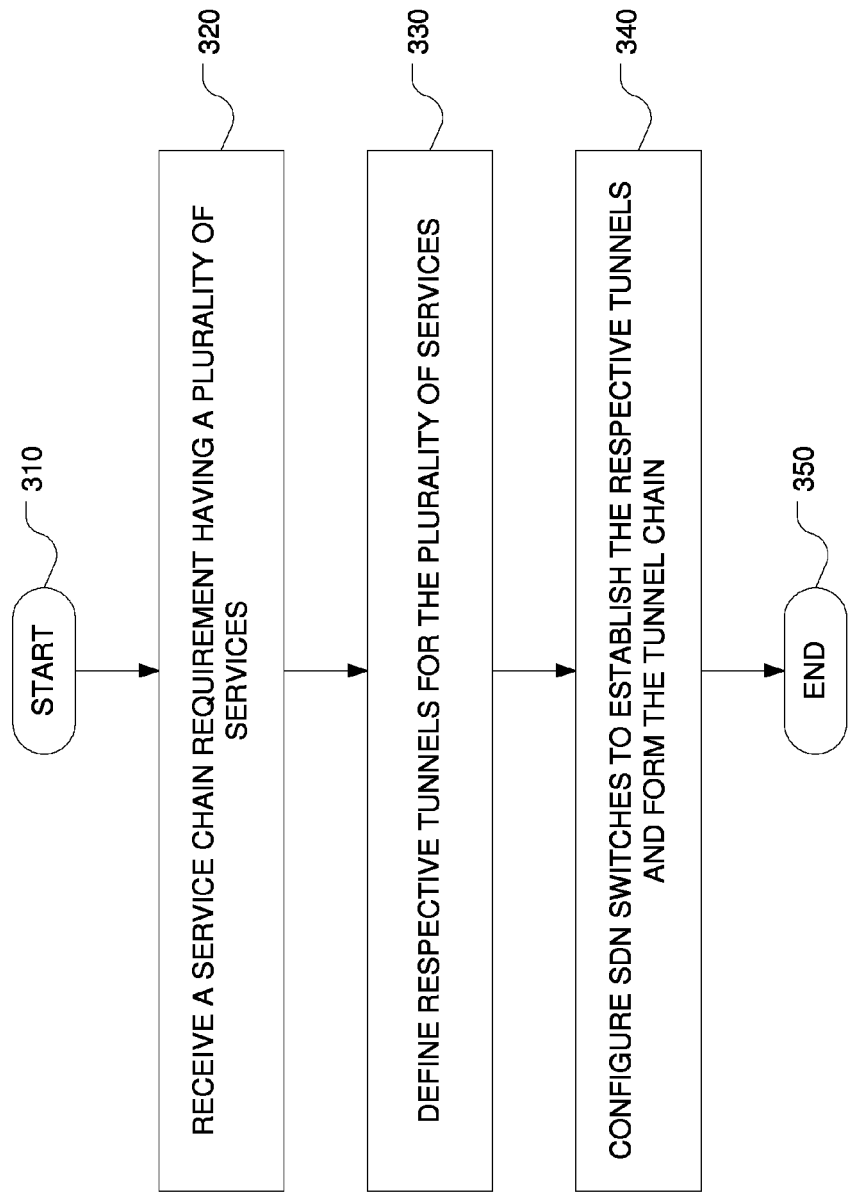
FIG. 3 is a flow diagram of one embodiment of a method of service chaining.

FIG. 3 is a flow diagram of one embodiment of a method of service chaining in an SDN. The method begins at a start step 310. The SDN includes multiple SDN switches in an SDN switch layer. At a receiving step 320, a service chain requirement is received. The service chain requirement includes a plurality of services. In certain embodiments, the service chain requirement is received at an SDN controller over a NBI.

At a controller step 330, respective tunnels for the plurality of services are defined. In certain embodiments, defining the respective tunnels includes parsing the plurality of services into adjacent service pairs. The pairs are then mapped to respective tunnels. At a pushing step 340, the SDN switches are configured. The configuring is achieved by computing configurations to setup the respective tunnels and form the tunnel chain. The computed configurations are then communicated to the SDN switches. In certain embodiments the configurations are communicated over an SBI. When the SDN switches receive the configurations, the corresponding hardware is configured to form the tunnels and the tunnel chain. Pushing step 340 is carried out before the initial service request is received at an ingress point for the SDN, and before any packet-in message is relayed to the SDN controller. The method then ends at an end step 350.

Figure 4:
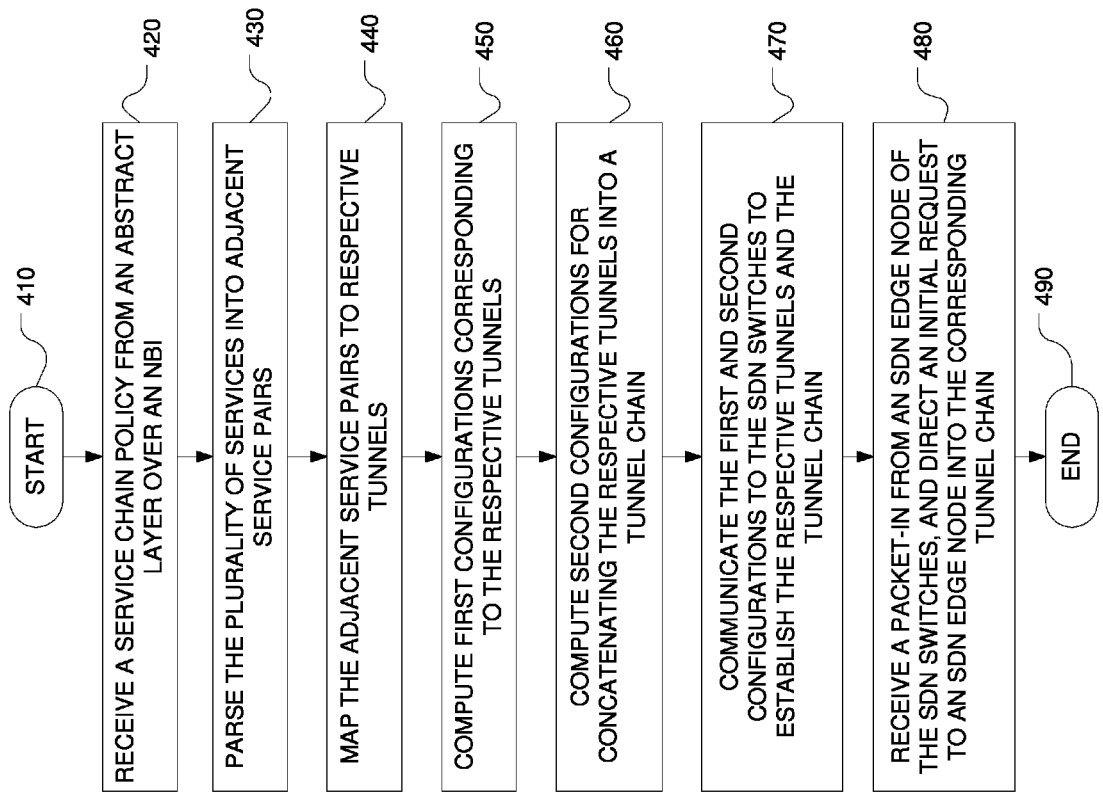
FIG. 4 is a flow diagram of another embodiment of a method of service chaining.

FIG. 4 is a flow diagram of another embodiment of a method of service chaining in an SDN. The method begins at a start step 410. At a receiving step 420, a service chain policy is received from an abstract layer over an NBI. The abstract layer can include an orchestrator or SDN applications configured to define the service chain policy and a corresponding service chain. The service chain includes a plurality of services. The service chain policy is received at an SDN controller that includes a service engine.

The service engine parses the plurality of services into adjacent service pairs at a parsing step 430. At a mapping step 440, the service engine maps the adjacent service pairs to respective tunnels. For each of the respective tunnels, the service engine computes configurations for the SDN switches at a first computing step 450. These first configurations establish the respective tunnels. At a second computing step 460, second configurations are computed that form a tunnel chain by concatenating the respective tunnels.

At a pushing step 470, the SDN controller communicates the first and second configurations to the SDN switches. The SDN switches then configure themselves to form the tunnels and the tunnel chain. The SDN controller communicates the configurations before an initial service request is received at an edge node of the SDN. When that initial request is received, the SDN controller receives a packet-in message from the edge node at a packet-in step 480, and then directs the initial request into the corresponding tunnel chain. The method then ends at an end step 490.

Figure 5:
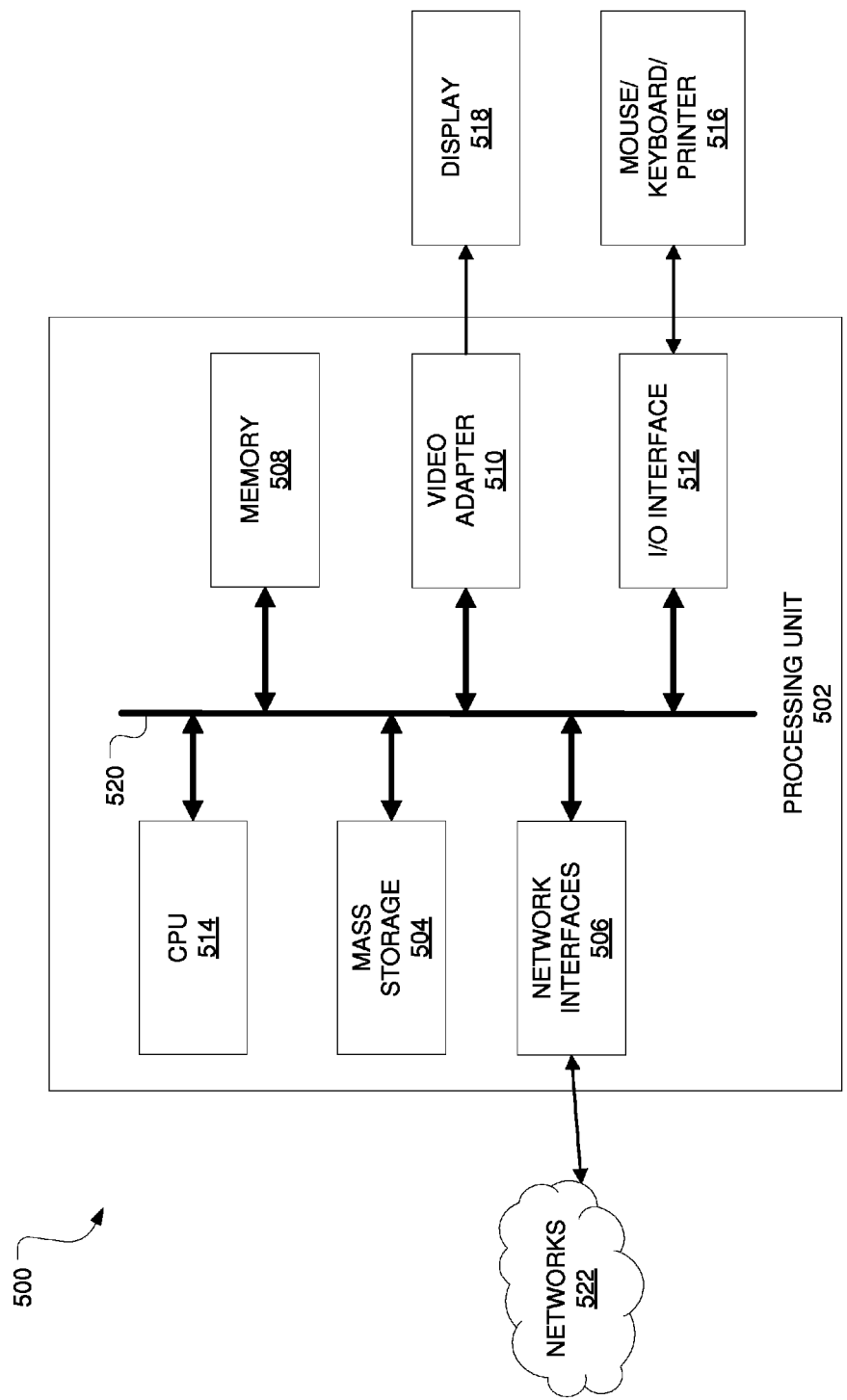
FIG. 5 is a block diagram of one embodiment of a computing system.

FIG. 5 is a block diagram of a computing system 500 that may be used for implementing the devices and methods disclosed herein. Specific devices may utilize all of the components shown or only a subset of the components. Levels of integration may vary from device to device. Furthermore, a device may contain multiple instances of a component, such as multiple processing units, processors, memories, transmitters, receivers, etc. The computing system 500 may comprise a processing unit 502 equipped with one or more input/output devices, such as a speaker, microphone, mouse, touchscreen, keypad, keyboard, printer, display, and the like. The processing unit may include a central processing unit (CPU) 514, memory 508, a mass storage device 504, a video adapter 510, and an I/O interface 512 connected to a bus 520.

The bus 520 may be one or more of any type of several bus architectures including a memory bus or memory controller, a peripheral bus, video bus, or the like. The CPU 514 may comprise any type of electronic data processor. The memory 508 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 508 may include ROM for use at boot-up, and DRAM for program and data storage for use while executing programs.

The mass storage 504 may comprise any type of non-transitory storage device configured to store data, programs, and other information and to make the data, programs, and other information accessible via the bus 520. The mass storage 504 may comprise, for example, one or more of a solid state drive, hard disk drive, a magnetic disk drive, an optical disk drive, or the like.

The video adapter 510 and the I/O interface 512 provide interfaces to couple external input and output devices to the processing unit 502. As illustrated, examples of input and output devices include a display 518 coupled to the video adapter 510 and a mouse/keyboard/printer 516 coupled to the I/O interface 512. Other devices may be coupled to the processing unit 502 and additional or fewer interface cards may be utilized. For example, a serial interface such as Universal Serial Bus (USB) (not shown) may be used to provide an interface for a printer.

The processing unit 502 also includes one or more network interfaces 506, which may comprise wired links, such as an Ethernet cable or the like, and/or wireless links to access nodes or different networks. The network interfaces 506 allow the processing unit 502 to communicate with remote units via the networks. For example, the network interfaces 506 may provide wireless communication via one or more transmitters/transmit antennas and one or more receivers/receive antennas. In an embodiment, the processing unit 502 is coupled to a local-area network 522 or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of service chaining in a software defined network (SDN) having SDN switches, the method comprising:
    receiving a service chain requirement having a plurality of services;
    defining respective tunnels for the plurality of services, wherein the defining comprises:
        parsing the plurality of services into adjacent service pairs;
        mapping the adjacent service pairs to the respective tunnels; and
    configuring the SDN switches to establish the respective tunnels and form a tunnel chain.

2. The method of claim 1 wherein the receiving comprises receiving a service chain policy from an orchestrator or SDN application over a north-bound interface (NBI).

3. The method of claim 1 wherein the configuring comprises communicating the configurations to the SDN switches over a south-bound interface (SBI).

4. The method of claim 3 wherein the communicating over an SBI comprises sending the configurations using an OpenFlow protocol or another south-bound (SB) protocol.

5. The method of claim 1 wherein the defining further comprises:
    computing SDN switch configurations corresponding to the respective tunnels and the tunnel chain.

6. The method of claim 1 wherein parsing the plurality of services comprises defining a null service representing an ingress point for a service request from a user.

7. The method of claim 1 wherein the configuring is carried out before receipt of a service request from a user at an SDN edge node.

8. A software defined network (SDN) controller, comprising:
a north-bound interface (NBI) over which a service chain policy is received, wherein the service chain policy defines a service chain having a plurality of services;
a non-transitory computer-readable memory storing instructions;
one or more processors in communication with the NBI and the memory, wherein the one or more processors execute the instructions to:
decompose the service chain policy into respective tunnels corresponding to adjacent service pairs of the plurality of services, and
compute configurations corresponding to the respective tunnels; and
a south-bound interface (SBI), in communication with the one or more processors, and over which the configurations are communicated to an SDN switch layer to establish the respective tunnels and form a tunnel chain.

9. The SDN controller of claim 8 wherein the one or more processors execute the instructions to:
parse the plurality of services into the adjacent service pairs; and
map the adjacent service pairs to the respective tunnels.

10. The SDN controller of claim 8 wherein the one or more processors execute the instructions to compute additional configurations to concatenate the respective tunnels into the tunnel chain.

11. The SDN controller of claim 8 wherein the SBI is configured to communicate with the SDN switch layer according to an OpenFlow protocol or another south-bound (SB) protocol.

12. The SDN controller of claim 8 wherein the one or more processors execute the instructions to push the configurations to the SDN switch layer before an initial service request arrives at an ingress point in the SDN switch layer, and a packet-in packet is sent to the SDN controller.

13. A method of service chaining in a software defined network (SDN) having SDN switches, the method comprising:
receiving, at an SDN controller, a service chain policy from an abstract layer over a north-bound interface (NBI), wherein the service chain policy defines a service chain having a plurality of services;
parsing, by a service engine, the plurality of services into adjacent service pairs;
mapping, by the service engine, the adjacent service pairs to respective tunnels;
computing, by the service engine, first configurations corresponding to the respective tunnels;
computing, by the service engine, second configurations for concatenating the respective tunnels into a tunnel chain;
communicating, by the SDN controller, the first configurations and the second configurations to the SDN switches to establish the respective tunnels and the tunnel chain; and
receiving, at the SDN controller, a packet-in from an SDN edge node of the SDN switches, and directing an initial request to the SDN edge node into the tunnel chain.

14. The method of claim 13 further comprising configuring, by the SDN controller, flow tables at the edge SDN switch after receiving the packet-in.

15. The method of claim 14 the flow tables comprise all of the plurality of services in an order specified by the service chain policy.

16. The method of claim 13 wherein the communicating the first configurations and the second configurations is carried out before receiving the packet-in.

17. The method of claim 13 wherein the plurality of services includes an intruder detection service (IDS), a network address translation (NAT) service, and an email service.

18. The method of claim 13 further comprising computing, by the service engine, flow configurations for start points of the respective tunnels to direct traffic into a next tunnel of the respective tunnels.

19. The method of claim 13 wherein each of the respective tunnels spans at least one SDN switch.

20. The method of claim 13 wherein the receiving from the abstract layer comprises receiving the service chain policy from an SDN application.

21. A software defined network (SDN) controller in an SDN having SDN switches, the SDN controller comprising:
a non-transitory computer-readable memory storing instructions;
one or more processors in communication with the memory, wherein the one or more processors execute the instructions for:
receiving a service chain requirement having a plurality of services;
defining respective tunnels for the plurality of services, wherein the defining comprises:
parsing the plurality of services into adjacent service pairs;
mapping the adjacent service pairs to the respective tunnels; and
configuring the SDN switches to establish the respective tunnels and form a tunnel chain.

22. The SDN controller of claim 21, wherein the defining further comprises computing SDN switch configurations corresponding to the respective tunnels and the tunnel chain.

23. A method of operating a software defined network (SDN) controller, the method comprising:
receiving, by a north-bound interface (NBI) of the SDN controller, a service chain policy, wherein the service chain policy defines a service chain having a plurality of services;
decomposing, by the SDN controller, the service chain policy into respective tunnels corresponding to adjacent service pairs of the plurality of services;
computing, by the SDN controller, configurations corresponding to the respective tunnels; and
communicating, by a south-bound interface (SBI) of the SDN controller, the configurations to an SDN switch layer to establish the respective tunnels and form a tunnel chain.

24. The method of claim 23, further comprising:
parsing, by the SDN controller, the plurality of services into the adjacent service pairs; and
mapping, by the SDN controller, the adjacent service pairs to the respective tunnels.

* * * * *